(12) United States Patent
Miller et al.

(10) Patent No.: US 11,594,192 B2
(45) Date of Patent: Feb. 28, 2023

(54) GENERATING MULTI-MONITOR RECOMMENDATIONS

(71) Applicant: Dell Products, L.P., Round Rock, TX (US)

(72) Inventors: Jason Todd Miller, Frisco, TX (US); Raul Johnson, Round Rock, TX (US); Marc N. McGarry, Murphy, TX (US); Neelakandan Nagarajan, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/880,388

(22) Filed: May 21, 2020

(65) Prior Publication Data

US 2021/0366430 A1 Nov. 25, 2021

(51) Int. Cl.
*G09G 5/00* (2006.01)
*G09G 5/12* (2006.01)
*G06N 20/00* (2019.01)

(52) U.S. Cl.
CPC ........... *G09G 5/003* (2013.01); *G09G 5/12* (2013.01); *G06N 20/00* (2019.01); *G09G 2320/08* (2013.01); *G09G 2340/14* (2013.01); *G09G 2356/00* (2013.01); *G09G 2370/22* (2013.01)

(58) Field of Classification Search
CPC ... G06F 3/04886; G06F 3/0481; G06F 3/0482
See application file for complete search history.

(56) References Cited

U.S. PATENT DOCUMENTS

| | | | | |
|---|---|---|---|---|
| 6,184,883 B1* | 2/2001 | Bates | ..................... | G06F 3/0481 715/794 |
| 2005/0168399 A1* | 8/2005 | Palmquist | ............. | G06F 1/1637 345/1.1 |
| 2006/0150108 A1* | 7/2006 | Adachi | ..................... | G09G 5/14 715/750 |
| 2006/0271878 A1* | 11/2006 | Hashimoto | ............. | G06F 3/048 715/781 |
| 2010/0039350 A1* | 2/2010 | Wakefield | ............. | G06F 1/1684 345/1.3 |
| 2010/0053164 A1* | 3/2010 | Imai | ..................... | H04N 13/279 345/1.3 |
| 2013/0086508 A1* | 4/2013 | Oguz | .................. | G06F 3/04883 715/779 |
| 2013/0191775 A1* | 7/2013 | Lawson | .................. | G06F 9/451 715/784 |
| 2019/0347790 A1* | 11/2019 | Lee | ........................ | G06T 7/0012 |
| 2020/0225899 A1* | 7/2020 | Lim | ........................ | G09G 5/005 |

* cited by examiner

*Primary Examiner* — Nan-Ying Yang
(74) *Attorney, Agent, or Firm* — Fogarty LLP

(57) ABSTRACT

Systems and methods for generating multi-monitor recommendations. In some embodiments, an Information Handling System (IHS) may include: a processor and a memory coupled to the processor, the memory having program instructions stored thereon that, upon execution, cause the IHS to: collect window information during use of the IHS; and create a multi-monitor recommendation based, at least in part, upon the window information.

20 Claims, 4 Drawing Sheets

GENERATING MULTI-MONITOR RECOMMENDATIONS

FIELD

This disclosure relates generally to Information Handling Systems (IHSs), and more specifically, to systems and methods for generating multi-monitor recommendations.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A monitor is an output device that displays information in visual form. Typically, a monitor comprises a display, circuitry, casing, and power supply. Although there are various different types of display devices available today, the display of choice for modern IHS monitors is the thin-film transistor Liquid Crystal Display (TFT-LCD) with Light Emitting Diode (LED) backlighting.

A multi-monitor configuration is a setup where a single IHS is coupled to multiple physical display devices, such as monitors, televisions, and/or projectors, in order to increase the desktop area available for computer programs running on that IHS. Depending on the type of work being performed, multi-monitor configurations may increase the user's productivity manifold.

SUMMARY

Systems and methods generating multi-monitor recommendations are provided. In an illustrative, non-limiting embodiment, an Information Handling System (IHS) may include: a processor and a memory coupled to the processor, the memory having program instructions stored thereon that, upon execution, cause the IHS to: collect window information during use of the IHS; and create a multi-monitor recommendation based, at least in part, upon the window information.

The collected window information may include: an identification of a foreground window, and coordinates of the foreground window. Additionally, or alternatively, the collected window information may include: an identification of a background window, coordinates of the background window, and a last time the background window received at least a keyboard or mouse input.

The program instructions, upon execution, may cause the IHS to remove at least one record from the collected window information in response to the record being for associated with an application that has been closed. Additionally, or alternatively, the program instructions, upon execution, may cause the IHS to remove at least one record from the collected window information in response to the record being for being associated with an application that has not received at least a keyboard or mouse input for a selected amount of time.

Additionally, or alternatively, the program instructions, upon execution, may cause the IHS to use the collected window information to determine a number of background windows that overlap a foreground window, and the multi-monitor recommendation may be created, at least in part, based upon the number of background windows. Additionally, or alternatively, the program instructions, upon execution, may cause the IHS to use the collected window information to determine a number of instances of background and foreground window swapping within a selected time duration, where the multi-monitor recommendation may be created, at least in part, based upon the number of instances of background and foreground window swapping.

Additionally, or alternatively, the program instructions, upon execution, may cause the IHS to use the collected window information to determine an amount of overlap between a background window and a foreground window, and the multi-monitor recommendation may be created, at least in part, based upon the amount of overlap. Additionally, or alternatively, the program instructions, upon execution, may cause the IHS to use the collected window information to identify at least one edge of a current display that is insufficient to render an entire background or foreground window, where the multi-monitor recommendation may be created, at least in part, based upon the identified edge.

In some cases, to generate the multi-monitor recommendation, the program instructions, upon execution, may cause the IHS to compare the collected window information against one or more recommendation thresholds set based upon historical recommendations. Additionally, or alternatively, to generate the multi-monitor recommendation, the program instructions, upon execution, may cause the IHS to process the collected window information using a machine learning (ML) engine.

A multi-monitor recommendation may include a suggested number of additional monitors. Additionally, or alternatively, the multi-monitor recommendation may include a suggested arrangement of additional monitors. Additionally, or alternatively, the multi-monitor recommendation may include an expected increase in productivity due to one or more additional monitors.

In another illustrative, non-limiting embodiment, a memory storage device may have program instructions stored thereon that, upon execution by one or more processors of an IHS, cause the IHS to: collect window information during use of the IHS and create a multi-monitor recommendation based, at least in part, upon the window information, where the multi-monitor recommendation comprises a suggested number of additional monitors.

In yet another illustrative, non-limiting embodiment, a method may include: collecting window information during use of an IHS, and creating a multi-monitor recommendation based, at least in part, upon the window information, where the multi-monitor recommendation comprises a suggested number of additional monitors.

BRIEF DESCRIPTION OF THE DRAWINGS

The present invention(s) is/are illustrated by way of example and is/are not limited by the accompanying figures.

DETAILED DESCRIPTION

Systems and methods for generating multi-monitor recommendations are described herein. In some embodiments, these systems and methods may increase monitor sale recommendations by determine how a user interacts with overlapping applications concurrently executed by an Information Handling System (IHS). Techniques are described for collecting trends of swapping between two or more foreground windows or applications that overlap within a selected time period.

In various implementations, these trends or usage patterns indicate that the user does not have enough screen real estate to efficiently accomplish their current task, and may be used to generate multi-monitor recommendations expected to increase the user's productivity and/or efficiency. For example, using the systems and methods described herein, a multi-monitor recommendation may be generated that enables the user to more quickly and accurately complete tasks, locate information and content faster, display more information at once, increase their visual work area, simultaneously compare and view information, and reduce application window switching.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
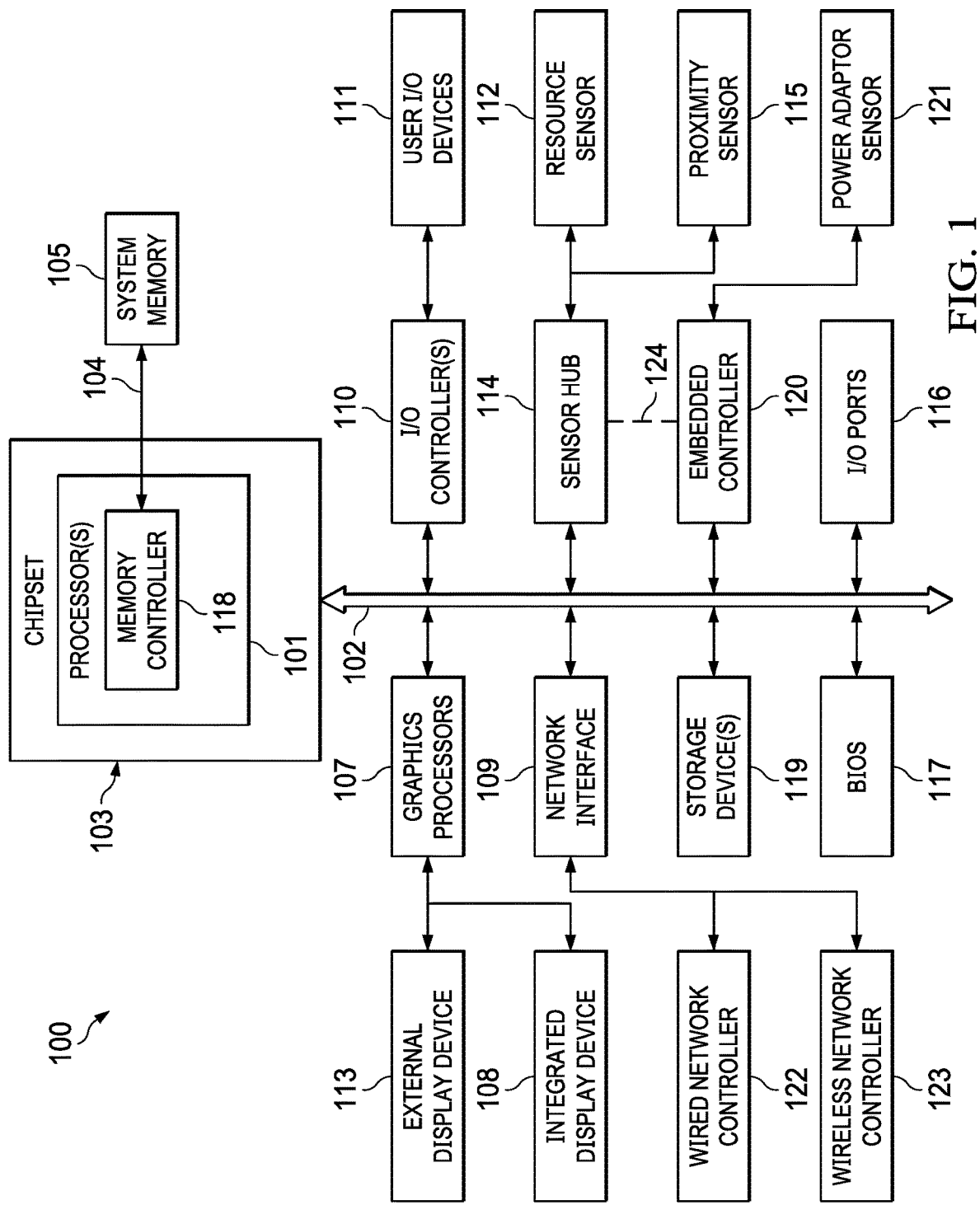
FIG. 1 is a block diagram illustrating an example of an Information Handling System (IHS) configured to generate multi-monitor recommendations, according to some embodiments.

FIG. 1 is a block diagram illustrating components of IHS 100 configured to manage performance optimization of applications. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to the processor(s) 101 of the IHS 100 through the chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as W-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and 113, coupled to IHS 100.

One or more display devices 108 and 113 coupled to IHS 100 may utilize LCD, LED, OLED, or other display technologies. Each display device 108 and 113 may be capable of receiving touch inputs such as via a touch controller that may be an embedded component of the display device 108 and 113 or graphics processor 107, or it may be a separate component of IHS 100 accessed via bus 102. In some cases, power to graphics processor 107, integrated display device 108 and/or external display 133 may be turned off, or configured to operate at minimal power levels, in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of sensors. For example, sensors may provide access to data describing environmental and operating conditions of IHS 100 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some implementations, sensor hub 114 may utilize hardware resource sensor(s) 112, which may include electrical current or voltage sensors, and that are capable of determining the power consumption of various components of IHS 100 (e.g., CPU 101, GPU 107, system memory 105, etc.). In certain embodiments, sensor hub 114 may also include capabilities for determining a location and movement of IHS 100 based on triangulation of network signal information and/or based on information accessible via the OS or a location subsystem, such as a GPS module.

In some embodiments, sensor hub 114 may support proximity sensor(s) 115, including optical, infrared, and/or sonar sensors, which may be configured to provide an indication of a user's presence near IHS 100, absence from IHS 100, and/or distance from IHS 100 (e.g., near-field, mid-field, or far-field).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions.

EC 120 may also implement operations for interfacing with power adaptor sensor 121 in managing power for IHS 100. These operations may be utilized to determine the power status of IHS 100, such as whether IHS 100 is operating from battery power or is plugged into an AC power source (e.g., whether the IHS is operating in AC-only mode, DC-only mode, or AC+DC mode). In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
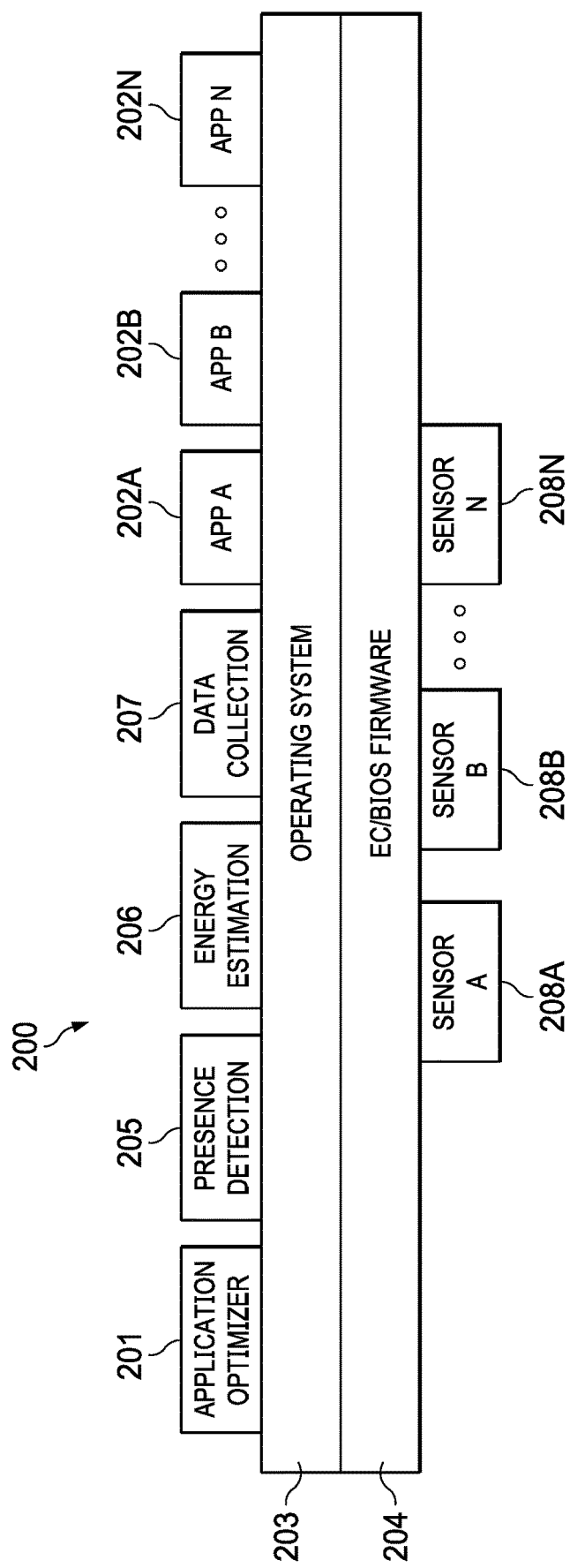
FIG. 2 is a block diagram illustrating an example of a software system produced by an IHS for generating multi-monitor recommendations, according to some embodiments.

FIG. 2 is a block diagram illustrating an example of software system 200 produced by IHS 100 for generating multi-monitor recommendations. In some embodiments, each element of software system 200 may be provided by IHS 100 through the execution of program instructions by one or more logic components (e.g., CPU 101, BIOS 117, EC 120, etc.) stored in memory (e.g., system memory 105), storage device(s) 119, and/or firmware 117, 120.

As shown, software system 200 includes application optimizer engine 201 configured to manage the performance optimization of applications 202A-N. An example of application optimizer engine 201 is the DELL PRECISION OPTIMIZER. Examples of applications 202A-N include, but are not limited to: computer graphics software, accounting software, audio player software, computer-aided design editors, data modeling tools, database tools, desktop publishing software, digital audio editors, operating systems, email clients, instant messaging clients, issue tracking systems, mail servers, network monitoring systems, simulation software, raster graphics editors, text editors, vector graphics editors, web server software, word processors, deep-learning software, etc.

Both application optimizer engine 201 and applications 202A-N are executed by OS 203, which is turn supported by EC/BIOS instructions/firmware 204. EC/BIOS firmware 204 is in communications with, and configured to receive data collected by, sensor modules or drivers 208A-N—which may abstract and/or interface with hardware resource sensor 112, proximity sensor 115, and power adaptor sensor 121, for example.

In various embodiments, software system 200 also includes presence detection module or application programming interface (API) 205, energy estimation engine or API 206, and data collection module or API 207 executed above OS 203.

Presence detection module 205 may process user presence data received by one or more of sensor modules 208A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field (user's position<threshold distance A), mid-field (threshold distance A<user's position<threshold distance B, where B>A), or far-field (user's position>threshold distance C, where C>B).

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

In some cases, energy estimation engine 206 may be configured to collect window information such as, for example: an identification of a foreground window, coordinates of the foreground window, an identification of a background window, coordinates of the background window, a last time the background window received at least a keyboard or mouse input, a number of background windows that overlap a foreground window, a number of instances of background and foreground window swapping within a selected time duration, an amount of overlap between a background window and a foreground window (e.g., in number of pixels), the identity at least one edge of a current display that is insufficient to render an entire background or foreground window and/or by how much (e.g., in number of pixels), etc.

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database or table that includes information related to IHS hardware utilization (e.g., by application, by thread, by hardware resource, etc.), power source (e.g., AC-plus-DC, AC-only, or DC-only), etc.

In some cases, processor(s) 101 may be configured to use context information collected by sensor modules 208A-N to determine the relative orientation and movement of IHS 100. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, processor(s) 101 may also determine a location and movement of IHS 100 based on triangulation of network signal and based on network information provided by the OS or network interface. In some embodiments, processor(s) 101 may support additional sensors, such as optical, infrared and sonar sensors, that may provide support for xR (virtual, augmented, and/or mixed reality) sessions hosted by IHS 100 and may be used to provide an indication of a user's presence near IHS 100, such as whether a user is present, absent, and/or facing a display.

In embodiments where IHS 100 may support multiple physical configurations, such as a convertible laptop, N-in-1 device, or the like, processor(s) 100 may utilize one or more of sensor modules 208A-N that collect readings that may be used in determining the current posture in which IHS 100 is physically configured. In certain embodiments, such posture determinations may be additionally made using the movement and orientation information provided by sensor modules 208A-N.

In laptop and convertible laptop embodiments, for example, processor(s) 100 may utilize a lid position sensor module to determine the relative angle between the two panels of the laptop in order to determine the mode in which IHS 100 is physically configured. In such embodiments, sensor modules 208A-N may measure the angle of rotation of the hinge that connects the base panel and lid panel of IHS 100. In some cases, processor(s) 100 may collect lid position information, such as the hinge angle, to then use in determining the posture in which IHS 100 is configured.

Processor(s) 101 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. Processor(s) 101 may additionally utilize orientation and movement information collected from inertial movement sensors to further determine the posture in which IHS 100 is physically configured.

For instance, if processor(s) 100 determine that IHS 100 is configured with a hinge angle of a laptop configuration, but IHS 100 is oriented on its side, IHS 100 may be determined to be in a book mode. If IHS 100 is determined to be tilted such that the hinge is oriented between horizontal and vertical, the user's face is detected to be facing the integrated display, and IHS 100 is experiencing slight movement, processor(s) 101 may determine that IHS 100 is being used in a book posture. Processor(s) 101 may determine that IHS 100 is opened to a 180-degree hinge angle and lies on a flat surface, thus indicating that IHS 100 it is being used in a landscape posture. Processor(s) 101 may similarly determine that IHS 100 is in a tent configuration, in response to detecting a hinge angle within a defined range, such as between 300 and 345 degrees, such that the hinge is aligned horizontally and is higher than both display panels of IHS 100.

In operation, application optimizer engine 201 may use machine learning to generate multi-monitor configurations (e.g., as shown in FIGS. 3-6) expected to improve user productivity based upon an application, window, or desktop usage pattern. For example, application optimizer engine 201 may create a classifier using a machine learning algorithm such as a Random Forest, Neural Network or the like. Combinations of different usage patterns are gathered. The data is used to train the classifier to identify which multi-monitor configuration (among multiple possible configurations) provides the highest increase in user's performance (e.g., fastest execution time) from a particular starting configuration (e.g., a single monitor).

After training, the classifier may identify a subset (e.g., top N, where 0<N<100) of window information. The subset of parameters may be those parameters that have the highest influence on increasing productivity, e.g., the parameters that, when varied, cause the largest change (e.g., improvement) and provide the most "bang for the buck." The subset of parameters is later used when the classifier is deployed to classify an application, window, or desktop usage pattern.

A trained classifier may analyze the data and identify a predefined application, window, or desktop usage pattern from among usage patterns that is closest (e.g., most similar) to a known usage pattern (e.g., determined based on the collected window data) associated with previous recommendations and expected to yield highest productivity gains. To illustrate, a number M of predefined or historical usage patterns (or clusters thereof) may be between 10 and 30, such as about 25 different types. In some cases, each different type of predefined or historical usage pattern may be associated recommendation thresholds such that, if one or more measures of the usage pattern (e.g., counts, averages, etc.) meet or exceed one or more recommendation thresholds, a corresponding multi-monitor recommendation (e.g., number and/or arrangement of displays) is selected. The classifier may analyze the data associated with foreground and background applications and determine that a given multi-monitor configuration is recommended, based upon the usage patterns, as likely to provide highest productivity gains if implemented.

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, the classifier may use the gathered window data to characterize the application, window, or desktop usage pattern, select a multi-monitor recommendation that corresponds to the application, window, or desktop usage pattern, and present the recommendation to the end-user, the user's manager in an organization, technical support personnel, or the like.

In various implementations, application optimizer engine 201 may compare current usage patterns with historical usage patterns associated with previous or historical multi-monitor recommendations. Expected productivity gains may be adjusted up or down based upon customer feedback after multi-monitor recommendations are adopted. In some cases, multiple multi-monitor recommendations may be provided to the user (e.g., number and arrangement of additional displays), and each recommendation may be associated with a different expected productivity again, expected time to reach a return-on-investment (based upon then productivity gains for a time duration), etc.

Figure 3:
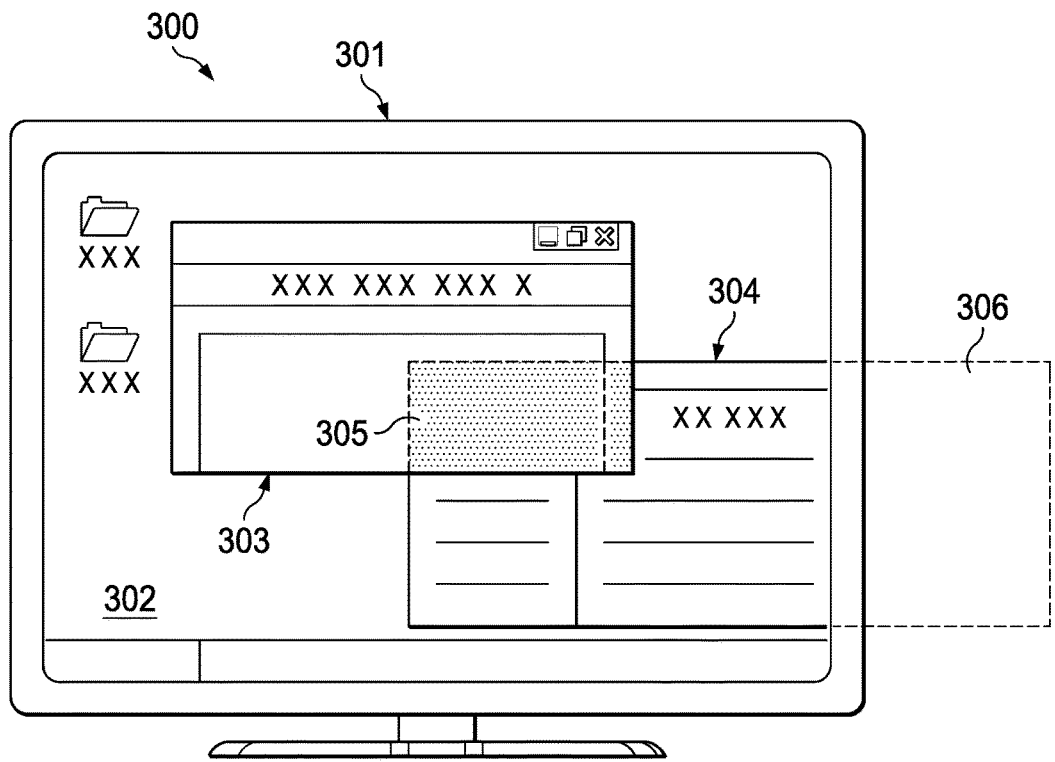
FIG. 3 is a block diagram of a desktop with foreground and background windows, according to some embodiments.
Figure 4A:
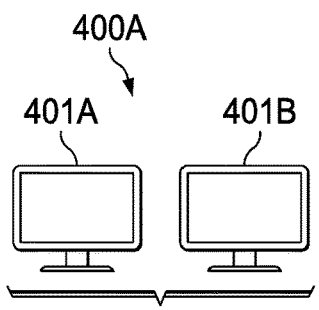
FIGS. 4A-D are diagrams of examples of dual-monitor recommendations, according to some embodiments.
Figure 4B:
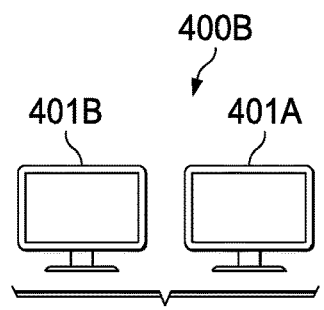
Figure 4C:
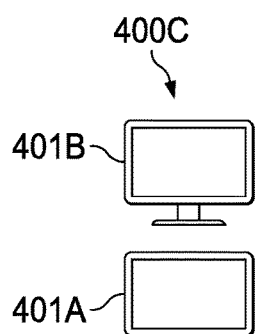
Figure 4D:
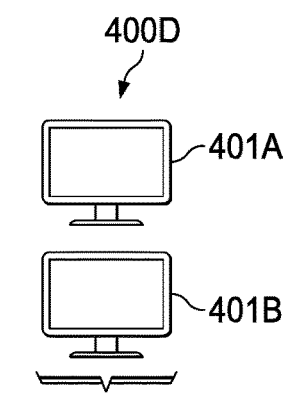

FIG. 3 is a block diagram of a desktop with foreground and background windows. In some embodiments, display 200 (e.g., 108 or 113) having edges 201 (top, bottom, left, and right) renders graphical desktop or workspace 202. In desktop 202, foreground application window 203 overlays portion 205 of background application window 204. Moreover, background window 204 has an out-of-bounds area 206 with respect display edge 201 (right side). In various embodiments, energy estimation engine 206 and/or data collection module 207 may be configured to monitor a user's activity with respect to desktop 202.

During operation of IHS 100, energy estimation engine 206 and/or data collection module 207 may collect window information such as, for example: an identification of windows 203 and 204, coordinates of windows 203 and 204, a last time when windows 203 and 204 received at least a keyboard or mouse input ("focus"), a number of windows that overlap (in this example, two windows) and for how long, a number of instances of the user swapping focus between windows 203 and 204 within a selected time duration, an amount of overlap 205 between windows 203 and 204 (e.g., in number of pixels), the identity the right edge of display 200 that is insufficient to render windows 203 and 204 and/or by how much 206 (e.g., in number of pixels), etc.

FIGS. 4A-D are diagrams of examples of dual-monitor recommendations 400A-D. In some embodiments, upon performance of method 600 in FIG. 6 below, optimizer engine 201 may generate dual-monitor recommendation 400A, with a suggested arrangement of main or original monitor 401A (e.g., integrated monitor 108) on the left and additional display 401B (e.g., external monitor 113) on the right. Additionally, or alternatively, optimizer engine 201 may generate dual-monitor recommendation 400B, with a suggested arrangement of main or original monitor 401B (e.g., integrated monitor 108) on the right and additional display 401B (e.g., external monitor 113) on the left. Additionally, or alternatively, optimizer engine 201 may generate dual-monitor recommendation 400C, with a suggested arrangement of main or original monitor 401A (e.g., integrated monitor 108) on the bottom and additional display 401B (e.g., external monitor 113) on top. Additionally, or alternatively, optimizer engine 201 may generate dual-monitor recommendation 400D, with a suggested arrangement of main or original monitor 401A (e.g., integrated monitor 108) on top and additional display 401B (e.g., external monitor 113) at the bottom.

Figure 5A:
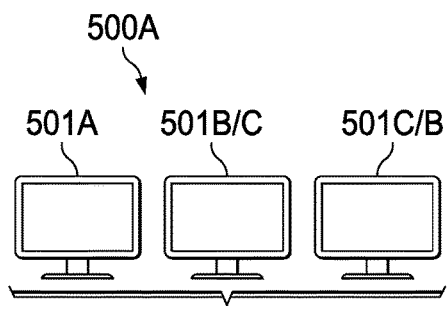
FIGS. 5A-C are diagrams of examples of triple-monitor recommendations, according to some embodiments.
Figure 5B:
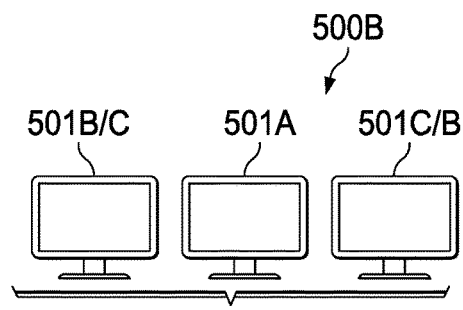
Figure 5C:
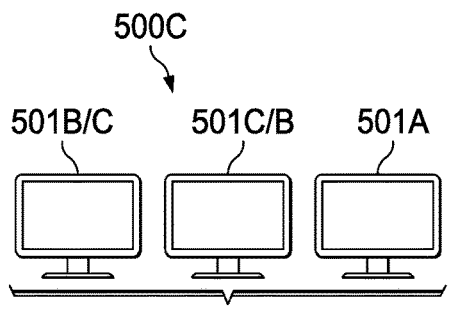

FIGS. 5A-C are diagrams of examples of triple-monitor recommendations 500A-C. In some embodiments, upon performance of method 600 in FIG. 6 below, optimizer engine 201 may generate dual-monitor recommendation 500A, with a suggested arrangement of main or original monitor 501A (e.g., integrated monitor 108) on the left and two additional displays 501B/C and 501C/B (e.g., a pair of external monitors 113) on the right.

Additionally, or alternatively, optimizer engine 201 may generate dual-monitor recommendation 500B, with a suggested arrangement of main or original monitor 501A (e.g., integrated monitor 108) in the center, first additional display 501B/C (e.g., an instance of external monitor 113) on the left, and second additional display 501C/B (e.g., another instance of external monitor 113) on the right. Additionally, or alternatively, optimizer engine 201 may generate dual-monitor recommendation 500C, with a suggested arrangement of main or original monitor 501A (e.g., integrated monitor 108) on the right and two additional displays 501B/C and 501C/B (e.g., a pair of external monitors 113) on the left.

Although only triple-monitor recommendations 500A-C are shown, it should be noted that a triple-monitor recommendation may include any other suitable arrangement, such as vertical arrangements with main or original monitor 501A at the bottom, center, or top, and/or or right angle arrangements with main or original monitor 501A at the corner, top, left, or right sides.

Figure 6A:
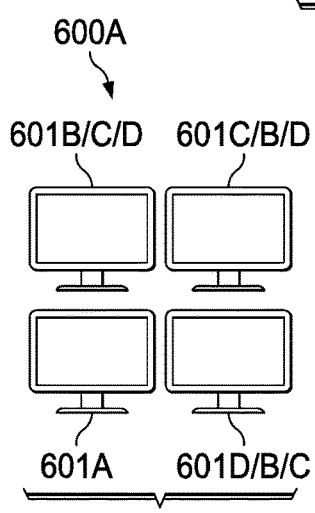
FIGS. 6A and 6B are diagrams of examples of quad-monitor recommendations, according to some embodiments.
Figure 6B:
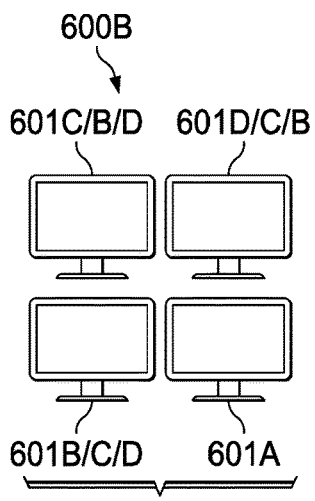

FIGS. 6A and 6B are diagrams of examples of quad-monitor recommendations 600A and 600B. In some embodiments, optimizer engine 201 may generate dual-monitor recommendation 600B, with a suggested arrangement of main or original monitor 601A (e.g., integrated monitor 108) in the bottom left quadrant and three additional displays 601B/C/D, 601C/B/D, and 601D/C/B (e.g., instances of external monitor 113s) in the other three quadrants. Additionally, or alternatively, optimizer engine 201 may generate dual-monitor recommendation 600B, with a suggested arrangement of main or original monitor 601A (e.g., integrated monitor 108) in the bottom right quadrant and three additional displays 601B/C/D, 601C/B/D, and 601D/C/B (e.g., instances of external monitor 113s) in the other three quadrants.

Although only quad-monitor recommendations 600A and 600B are shown, it should be noted that a quad-monitor recommendation may include any other suitable arrangement, such as horizontal and vertical arrangements, triangular arrangements (three monitors along the same line and the forth monitor next to the line), or arrangements where main or original monitor 601A (e.g., integrated monitor 108) is in a different quadrant.

Figure 7:
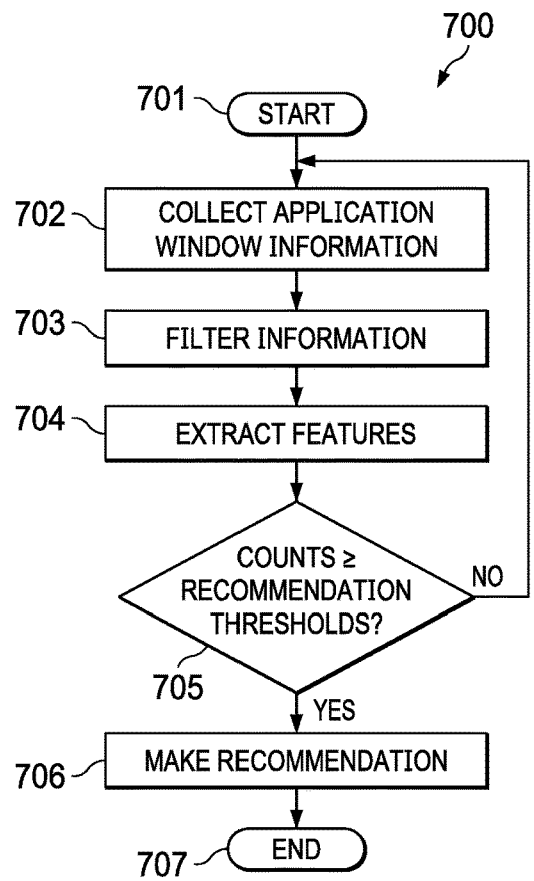
FIG. 7 is a flowchart of an example of a method for generating multi-monitor recommendations, according to some embodiments.

FIG. 7 is a flowchart of an example of method 700 for generating multi-monitor recommendations. In some embodiments, method 700 may be performed by application optimizer engine 201 under execution of processor(s) 101 of IHS 100. In other cases, however, method 700 may be performed by another local application or service, another IHS in communication with IHS 100, a remote or cloud service, etc.

As shown, method 700 starts at block 601. At block 702, method 700 collects application window information. For example, collected application window information may include, for example, an identification of a foreground window, coordinates of the foreground window, an identification of a background window, coordinates of the background window, a last time the background window received at least a keyboard or mouse input, etc.

At block 703, method 700 may filter or remove certain information from the set of collected application window information. For example, block 703 may remove records associated with applications that have been closed, records associated with an application that has not received at least a keyboard or mouse input for a selected amount of time, etc.

At block 704, method 700 may extract features from the filtered information. For example, block 704 may determine, using the collected application window information, a number of background windows that overlap a foreground window, a number of instances of background and foreground window swapping within a selected time duration, an amount of overlap between a background window and a foreground window, an edge of a current display or display arrangement that is insufficient to render an entire background or foreground window, etc.

At block 705, method 700 determines whether the extracted features (e.g., in terms of counts or averages) meet one or more multi-monitor recommendation thresholds. In some cases, ML algorithms may be used make that determination. Additionally, or alternatively, extracted features with shortest Euclidian distance from a vector of recommendation thresholds may indicate that a given multi-monitor recommendation associated with the vector should be selected. In some cases, each multi-monitor recommendation may be associated with a range of thresholds based on historical recommendations and/or customer feedback. If the recommendation thresholds are not met, control returns to block 702.

Conversely, if block 705 determines that recommendation thresholds are met and at least one corresponding multi-monitor recommendation is selected, block 706 generates the recommendation(s), each recommendation having one or more of: a number of additional displays, a particular arrangement or spatial configuration for the displays, an expected productivity increase (e.g., 20% more efficient), and/or an expected return on investment. Then method 700 ends at block 707.

In most IHS operating systems, a single application can have keyboard and mouse focus at any given time. Using the techniques described herein, IHS 100 may collect the window handle, position in desktop coordinates, and the last time the application received focus. This information may be cached in memory and used to determine how the user interacts with other foreground applications. The following calculations may be performed on a fixed interval: removing records for applications that have been closed, removing records for applications that have not received focus within a short time span (e.g., 60-180 second range), and counting the number of remaining applications that overlap the current foreground application. A summarization routine may be performed on a periodic basis to review all of the samples collected within the given time period, and to count the number of instances of frequent swapping within a short time duration as well as the overall average of the overlap count. These counts and average values may be monitored, and a recommendation for additional monitor(s) may be made if the values reach empirically selected thresholds.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
   collect window information of a current arrangement of a plurality of existing monitors during use of the IHS;
   determine an expected productivity gain of a user using the collected window information, the expected productivity gain comprising an estimated productivity via use of an adopted arrangement of the existing monitors and one or more yet to be implemented monitors relative to a measured productivity via use of only the existing monitors; and
   create a multi-monitor recommendation based, at least in part, upon the expected productivity gain, the multi-monitor recommendation comprising information associated with a suggestion to implement the adopted arrangement of the plurality of monitors that are configured to display one or more windows associated with the window information.

2. The IHS of claim 1, wherein the collected window information comprises: an identification of a foreground window, and coordinates of the foreground window.

3. The IHS of claim 1, wherein the collected window information comprises: an identification of a background window, coordinates of the background window, and a last time the background window received at least one of a keyboard or mouse input.

4. The IHS of claim 1, wherein the program instructions, upon execution, cause the IHS to remove at least one record from the collected window information in response to the record being associated with an application that has been closed.

5. The IHS of claim 1, wherein the program instructions, upon execution, cause the IHS to remove at least one record from the collected window information in response to the record being associated with an application that has not received at least one of a keyboard or mouse input for a specified amount of time.

6. The IHS of claim 1, wherein the program instructions, upon execution, cause the IHS to use the collected window information to determine a number of background windows that overlap a foreground window, and wherein the multi-monitor recommendation is created, at least in part, based upon the number of background windows.

7. The IHS of claim 1, wherein the program instructions, upon execution, cause the IHS to use the collected window information to determine a number of instances of background and foreground window swapping within a specified time duration, and wherein the multi-monitor recommendation is created, at least in part, based upon the number of instances of background and foreground window swapping.

8. The IHS of claim 1, wherein the program instructions, upon execution, cause the IHS to use the collected window information to determine an amount of overlap between a background window and a foreground window, and wherein the multi-monitor recommendation is created, at least in part, based upon the amount of overlap.

9. The IHS of claim 1, wherein the program instructions, upon execution, cause the IHS to use the collected window information to identify at least one edge of a current display that is insufficient to render an entire background or foreground window, and wherein the multi-monitor recommendation is created, at least in part, based upon the identified edge.

10. The IHS of claim 1, wherein to generate the multi-monitor recommendation, the program instructions, upon execution, cause the IHS to compare the collected window information against one or more recommendation thresholds set based upon historical recommendations.

11. The IHS of claim 1, wherein to generate the multi-monitor recommendation, the program instructions, upon execution, cause the IHS to process the collected window information using a machine learning (ML) engine.

12. A memory storage device having program instructions stored thereon that, upon execution by one or more processors of an Information Handling System (IHS), cause the IHS to:
collect window information of a current arrangement of a plurality of existing monitors during use of the IHS;
determine an expected productivity gain using the collected window information, the expected productivity gain comprising an estimated productivity via use of an adopted arrangement of the existing monitors and one or more yet to be implemented monitors relative to a measured productivity via use of only the existing monitors; and
create a multi-monitor recommendation based, at least in part, upon the expected productivity gain of a user, wherein the multi-monitor recommendation comprises information associated with a suggestion to implement the adopted arrangement of the plurality of monitors that are configured to display one or more windows associated with the window information, wherein the suggested adopted arrangement comprises a suggested arrangement of the existing monitors and one or more yet to be implemented monitors relative to one another.

13. A method, comprising:
collecting window information of a current arrangement of a plurality of existing monitors during use of an Information Handling System (IHS);
determining an expected productivity gain using the collected window information, the expected productivity gain comprising an estimated productivity via use of an adopted arrangement of the existing monitors and one or more yet to be implemented monitors relative to a measured productivity via use of only the existing monitors; and
creating a multi-monitor recommendation based, at least in part, upon the expected productivity gain of a user, wherein the multi-monitor recommendation comprises a suggested number of additional monitors, and wherein the multi-monitor recommendation comprises information associated with a suggestion to implement the adopted arrangement of the plurality of monitors that are configured to display one or more windows associated with the window information.

14. The method of claim 13, further comprising removing at least one record from the collected window information in response to the record being associated with an application that has been closed.

15. The method of claim 13, further comprising removing at least one record from the collected window information in response to the record being associated with an application that has not received at least one of a keyboard or mouse input for a specified amount of time.

16. The method of claim 13, further comprising using the collected window information to determine a number of background windows that overlap a foreground window, and wherein the multi-monitor recommendation is created, at least in part, based upon the number of background windows.

17. The method of claim 13, further comprising using the collected window information to determine a number of instances of background and foreground window swapping within a specified time duration, and wherein the multi-monitor recommendation is created, at least in part, based upon the number of instances of background and foreground window swapping.

18. The method of claim 13, further comprising using the collected window information to determine an amount of overlap between a background window and a foreground window, and wherein the multi-monitor recommendation is created, at least in part, based upon the amount of overlap.

19. The method of claim 13, further comprising using the collected window information to identify at least one edge of a current display that is insufficient to render an entire background or foreground window, and wherein the multi-monitor recommendation is created, at least in part, based upon the identified edge.

20. The method of claim 13, further comprising comparing the collected window information against one or more recommendation thresholds set based upon historical recommendations.

* * * * *